Oct. 21, 1924.
A. HODGES
1,512,762
FERTILIZER DISTRIBUTOR
Filed June 15, 1923    2 Sheets-Sheet 1
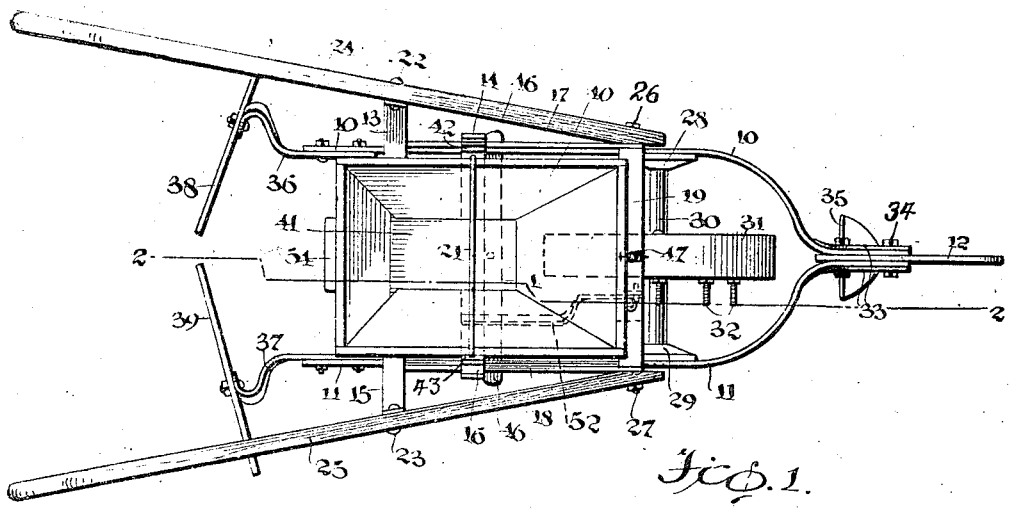
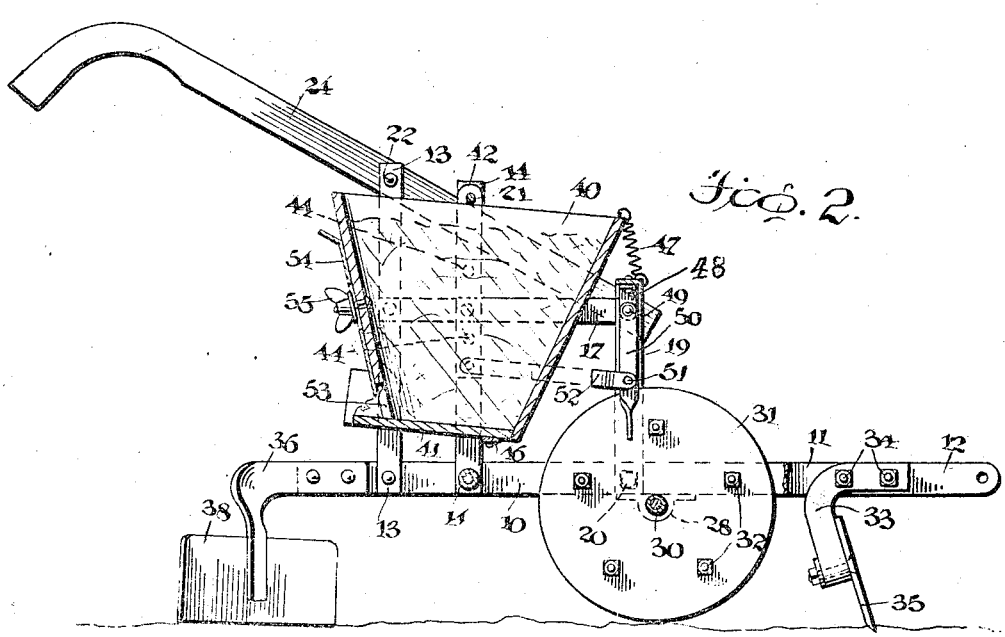
INVENTOR.
A. Hodges,
BY
Geo. P. Kimmel.
ATTORNEY.

Oct. 21, 1924.
A. HODGES
1,512,762
FERTILIZER DISTRIBUTOR
Filed June 15, 1923    2 Sheets-Sheet 2
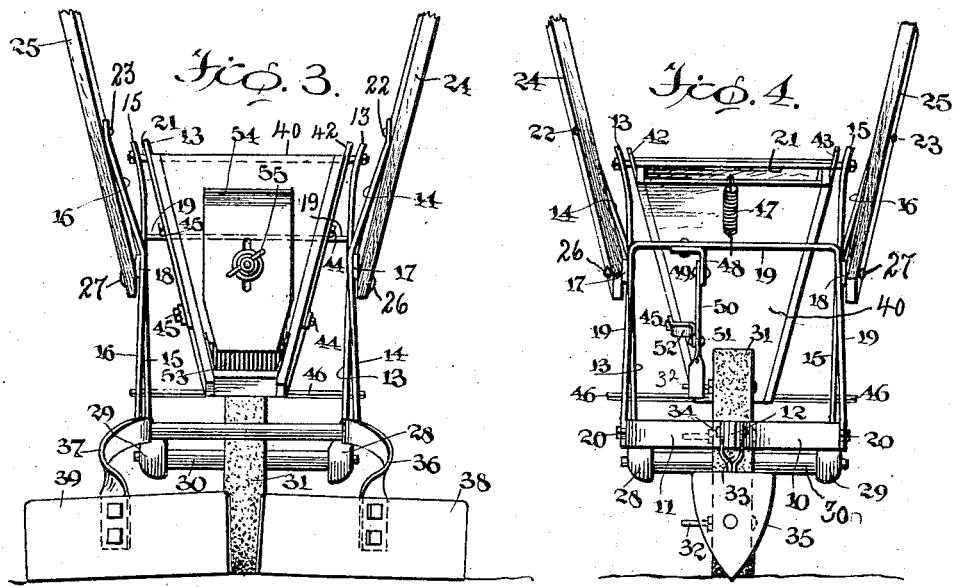
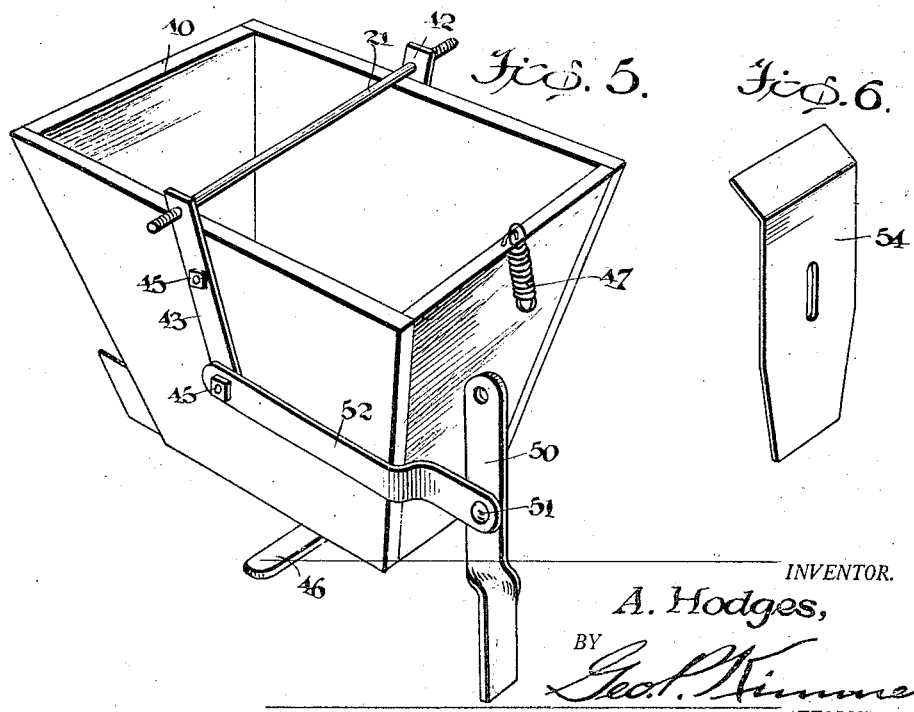
INVENTOR.
A. Hodges,
BY Geo. P. Kimmel
ATTORNEY.

Patented Oct. 21, 1924.

1,512,762

UNITED STATES PATENT OFFICE.

ALEXANDER HODGES, OF HEADLAND, ALABAMA.

FERTILIZER DISTRIBUTOR.

Application filed June 15, 1923. Serial No. 645,607.

*To all whom it may concern:*

Be it known that I, ALEXANDER HODGES, a citizen of the United States, residing at Headland, in the county of Henry and State of Alabama, have invented certain new and useful Improvements in Fertilizer Distributors, of which the following is a specification.

This invention relates to fertilizer distributors, and has for one of its objects to provide a device of this character of improved construction and increased efficiency.

Another object of the invention is to provide a device of this character including a container for the material to be distributed and with improved means for imparting a jarring motion to the container as the apparatus is moved over the ground to effect the distribution of the fertilizer material.

Another object of the invention, is to provide a device of this character, including a container for the material to be distributed, and suspended for vibration, with the suspending means entirely above the lines of the container and without obstructions of any kind within the same.

With these and other objects in view the invention consists in certain novel features of construction as hereinafter shown and described and then specifically pointed out in the claim, and in the drawings illustrative of the preferred embodiment of the invention, Figure 1 is a plan view of the improved apparatus.

Fig. 2 is a longitudinal section on the line 2—2 of Fig. 1.

Fig. 3 is a rear elevation.

Fig. 4 is a front elevation.

Fig. 5 is an enlarged perspective view of the container for the material to be distributed.

Fig. 6 is an enlarged perspective view of the controlling slide of the container discharge.

The improved apparatus includes a supporting frame having spaced side members 10 and 11 converging toward the forward ends and united to a draft bar 12.

Rising from the side members 10 are spaced standards 13 and 14, and rising from the side member 11 are like spaced standards 15 and 16. The standards 13 and 14 are connected intermediate the ends by a brace bar 17, while the standards 15 and 16 are connected intermediate the ends by a brace bar 18. At their forward ends the bars 17 and 18 are connected to an upwardly arching member 19, the latter connected at 20 to the frame members 10 and 11.

The standards 14 and 16 are connected together by a tie rod 21, while the standards 13 and 15 are diverged at their upper portions and coupled at 22 and 23 to handle members 24 and 25. At their forward ends the handles 24 and 25 are coupled at 26 and 27 to the sides of the upwardly arching member 19.

By this arrangement a strong rigid frame is produced including the guide handles 24 and 25.

Attached to the lower faces of the side members 10 and 11 are bearings 28 and 29 to support an axle 30, the latter carrying a bearing wheel 31. Projecting from one side face of the wheel 31 are a plurality of spaced studs 32, the object to be hereinafter explained.

A standard 33 is connected at 34 to the forward ends of the frame members 10 and 11 and carries a furrow opener 35, while standards 36 and 37 are connected respectively to the rear ends of the members 10 and 11 and carry furrow covers 38 and 39.

Disposed between the standards 13 and 14, and 15 and 16 is a container or hopper for the material to be distributed and represented as a whole at 40 with a restricted discharge 53 at the rear and the bottom 41 normally inclined downwardly and forwardly from the discharge opening as shown.

Mounted to swing on the tie rod 21 are suspension straps 42 and 43, and rigidly attached at 44 and 45 to the side walls of the container.

The container is wholly below the line of the tie rod, so that the interior of the container is wholly unobstructed, and nothing interferes with the free escape of the contents when the container is agitated.

A stop member 46 is attached to the bottom 41 of the container and extended at the ends to contact with the standards 14 and 15, and attached to the container and to the member 19 is a spring 47 operating to yieldably hold the stop 46 against the standards 14 and 15.

By this means the container is free to swing upon the rod 21 to a limited extent, and is held yieldably with its stop 46 against the standards 14 and 15 by the spring 47.

Depending from the member 19 is a hanger 48, and pivoted at 49 to the hanger is a trip lever 50, the latter extending at its lower end into the paths of the studs 32.

Pivoted respectively to the lower fastening device 45 and at 51 to the trip lever 50, is a connecting member 52.

By this arrangement as the apparatus is drawn over the ground by the draft animals or other tractive force coupled to the member 12, the rotation of the wheel 31 will cause the studs 32 to move the tripper lever 50 forwardly and pass beneath it to swing the container forwardly against the resistance of the spring 47, and when the stud passes beneath the lower end of the trip lever, the container will be released and the reaction of the spring 47 will suddenly return it to its former position with the stop 46 against the standards 14 and 16. This produces a strong jarring action to the container and aids materially in the effect of the discharge of the fertilizing element, as will be obvious.

As before stated the rear wall of the container is provided with a restricted outlet 53 for the passage of the material, the size of the opening being controlled by a slotted slide 54 and clamp bolt 55.

Arranging the container 40 so that its bottom 41 is constantly inclined downwardly and forwardly from the restricted discharge opening 53 is an important feature of applicant's structure, as the material in the container is thus prevented from running out of the container during the time the latter is not being vibrated.

The improved implement is simple in construction, can be constructed of any suitable material and any size or capacity.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention, what is claimed as new is:—

An apparatus for the purpose set forth comprising a rearwardly discharging shiftable container, a pair of spaced vertical standards opposing each side thereof, one standard of each pair arranged forwardly of the other standard of the pair, a frame carrying said standards and positioned below the container, means for connecting each pair of standards together and projecting forwardly therefrom, an arch-shaped member arranged in advance of the container and secured to said frame and means, a resilient connection between the container and said member, a rod connected to the upper ends of the forward standards and extending over the container and coupled with the sides thereof, a trip lever suspended from said member and pivotally connected with one side of the container, means carried by the frame for actuating said lever to shift the container, and handles secured to said standard connecting means and to said rear standards.

In testimony whereof, I affix my signature hereto.

ALEXANDER HODGES.